(12) United States Patent
Baldwin

(10) Patent No.: US 12,212,129 B1
(45) Date of Patent: *Jan. 28, 2025

(54) ELECTRICAL OUTLET COVER GASKET WITH BUG COVER AT THE CORD PORT

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,012

(22) Filed: Nov. 7, 2023

Related U.S. Application Data

(63) Continuation of application No. 17/138,754, filed on Dec. 30, 2020, now Pat. No. 11,862,953.

(51) Int. Cl.
*H02G 3/14* (2006.01)

(52) U.S. Cl.
CPC ........... *H02G 3/14* (2013.01); *A01M 2200/01* (2013.01)

(58) Field of Classification Search
CPC ....... H02G 3/1418; H02G 3/083; H01R 13/52
See application file for complete search history.

(56) References Cited

U.S. PATENT DOCUMENTS

| | | | | |
|---|---|---|---|---|
| 4,424,407 A | * | 1/1984 | Barbic | H02G 3/088 174/67 |
| 6,133,531 A | * | 10/2000 | Hayduke | H02G 3/081 174/67 |
| 6,265,670 B1 | * | 7/2001 | Duesterhoeft | H02G 3/083 174/152 G |
| 8,101,861 B1 | | 1/2012 | Shotey | |
| 2011/0001408 A1 | | 1/2011 | Caveney | |

* cited by examiner

*Primary Examiner* — Vanessa Girardi
(74) *Attorney, Agent, or Firm* — Booth Udall Fuller, PLC; Kenneth C. Booth

(57) ABSTRACT

An electrical outlet cover gasket comprising a rectangular front face, a rectangular rear face opposite the front face, a central aperture extending through a center of the gasket, and a bug cover. The bug cover is molded as a single piece with the gasket and extends forward from the front face. The bug cover may extend forward from the front face on at least two sides of the front face. Additionally, the bug cover may have at least one slit extending through the bug cover. The at least one slit allows an electrical cord to pass through the bug cover. The bug cover is configured to cover at least one cord port of the electrical outlet cover when the gasket is installed in an electrical outlet cover.

20 Claims, 8 Drawing Sheets

ELECTRICAL OUTLET COVER GASKET WITH BUG COVER AT THE CORD PORT

CROSS REFERENCE TO RELATED APPLICATIONS

This application is a continuation of U.S. Utility patent application Ser. No. 17/138,754 entitled "Electrical Outlet Cover Gasket With Bug Cover At The Cord Port" to Jeffrey P. Baldwin that was filed on Dec. 30, 2020, the disclosure of which is hereby incorporated herein by reference.

TECHNICAL FIELD

Aspects of this document relate generally to gaskets for electrical outlet covers, and more specifically to gaskets with an integrated bug cover to restrict access to the interior of the electrical outlet cover by bugs.

BACKGROUND

Many electrical outlet covers allow an electrical plug to access the electrical outlet with the lid closed. Some covers do this by having a cord port through which an electrical cord can extend to exit the electrical outlet cover when the lid is closed. However, this leaves a hole in the electrical outlet cover that allows bugs to enter the electrical outlet cover.

SUMMARY

Aspects of this document relate to an electrical outlet cover gasket comprising a rectangular front face and a rectangular rear face opposite the front face, a central aperture extending through a center of the gasket, a plurality of prong apertures arranged surrounding the central aperture and extending through the gasket, each of the plurality of prong apertures configured to receive a prong of a plurality of prongs of an electrical outlet cover, a plurality of troughs in the rear face, wherein each of the plurality of troughs is aligned with a prong aperture of the plurality of prong apertures and configured to couple with an end of the prong when the prong extends through the prong aperture, and a bug cover molded as a single piece with the gasket and extending forward from the front face on at least two sides of the front face, and having at least one slit extending through the bug cover, the bug cover configured to cover at least one cord port of the electrical outlet cover when the gasket is installed in the electrical outlet cover, wherein the at least one slit allows an electrical cord to pass through the bug cover.

Particular embodiments may comprise one or more of the following features. The bug cover may extend forward from a corner of the front face. The gasket may be formed of only one material. The gasket may be configured to extend along an interface between a base and a lid of the electrical outlet cover and limit the entrance of water into the electrical outlet cover through the interface between the base and the lid when the gasket is installed in the electrical outlet cover and the lid is in a closed position.

Aspects of this document relate to an electrical outlet cover gasket comprising a front face and a rear face opposite the front face, a central aperture extending through a center of the gasket and forming a continuous ring around the central aperture, a plurality of prong apertures arranged surrounding the central aperture and extending through the gasket, each of the plurality of prong apertures configured to receive a prong of a plurality of prongs of an electrical outlet cover, and a bug cover formed integrally with the gasket, extending forward from the front face and having at least one slit therethrough, the bug cover configured to cover a cord port of the electrical outlet cover when the gasket is installed in the electrical outlet cover, wherein the at least one slit allows an electrical cord to pass through the bug cover.

Particular embodiments may comprise one or more of the following features. The electrical outlet cover gasket may further comprise a plurality of troughs in the rear face, wherein each of the plurality of troughs is aligned with a prong aperture of the plurality of prong apertures and configured to couple with an end of the prong when the prong extends through the prong aperture. The bug cover may extend forward from the front face on at least two sides of the front face. The bug cover may be configured to completely cover the cord port of the electrical outlet cover. The bug cover may extend forward from a corner of the front face. The gasket may be formed of only one material. The gasket may be configured to extend along an interface between a base and a lid of the electrical outlet cover and limit the entrance of water into the electrical outlet cover through the interface between the base and the lid when the gasket is installed in the electrical outlet cover and the lid is in a closed position.

Aspects of this document relate to an electrical outlet cover gasket comprising a front face and a rear face opposite the front face, a central aperture extending through the gasket, and a bug cover formed as a single piece with the gasket and extending forward from the front face, the bug cover configured to cover a cord port of an electrical outlet cover and allow an electrical cord to pass through when the gasket is installed in the electrical outlet cover.

Particular embodiments may comprise one or more of the following features. The electrical outlet cover gasket may further comprise a plurality of prong apertures arranged surrounding the central aperture and extending through the gasket, each of the plurality of prong apertures configured to receive a prong of a plurality of prongs of the electrical outlet cover. The electrical outlet cover gasket may further comprise a plurality of troughs in the rear face, wherein each of the plurality of troughs is aligned with a prong aperture of the plurality of prong apertures and configured to couple with an end of the prong when the prong extends through the prong aperture. The bug cover may extend forward from a corner of the front face. The bug cover may extend forward from the front face on at least two sides of the front face. The bug cover may have at least one slit, wherein the at least one slit allows an electrical cord to pass through the bug cover. The bug cover may be configured to completely cover the cord port of the electrical outlet cover. The gasket may be formed of only one material. The gasket may be configured to extend along an interface between a base and a lid of the electrical outlet cover and limit the entrance of water into the electrical outlet cover through the interface between the base and the lid when the gasket is installed in the electrical outlet cover and the lid is in a closed position.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
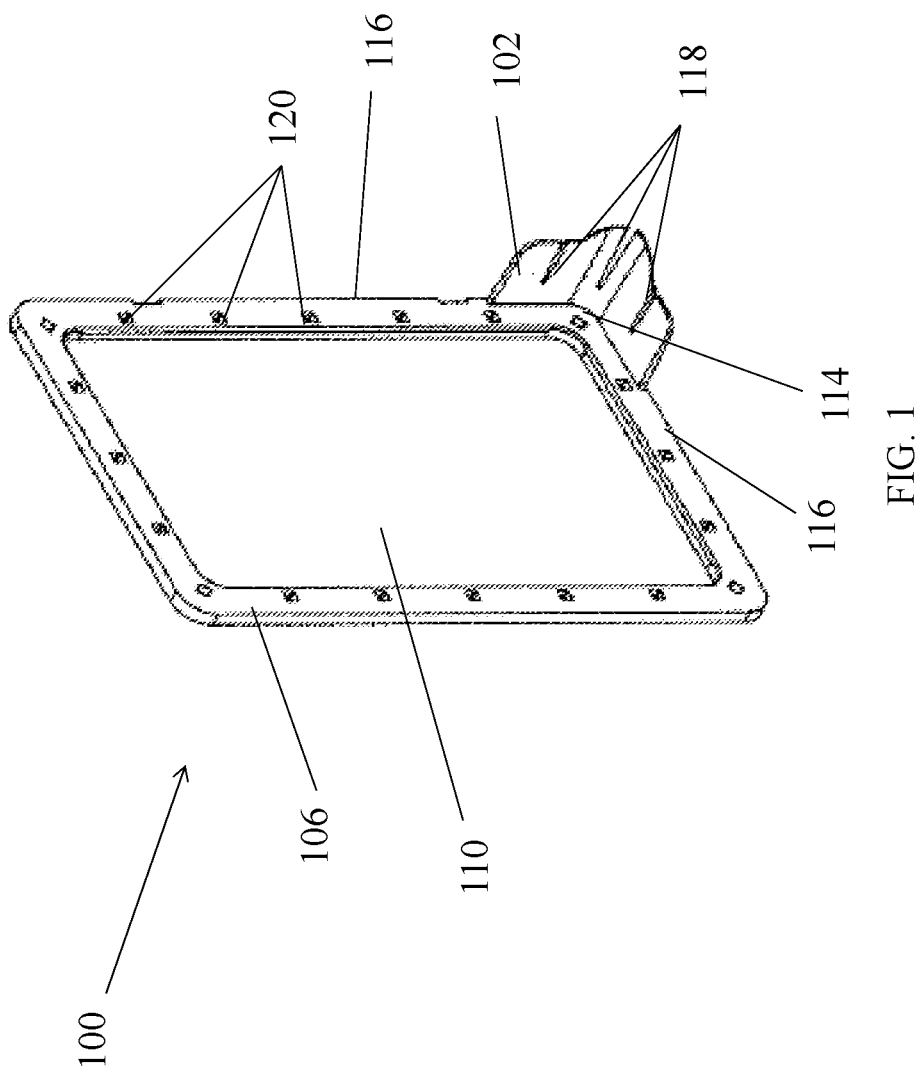
FIG. 1 is a front perspective view of an electrical outlet cover gasket.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 2:
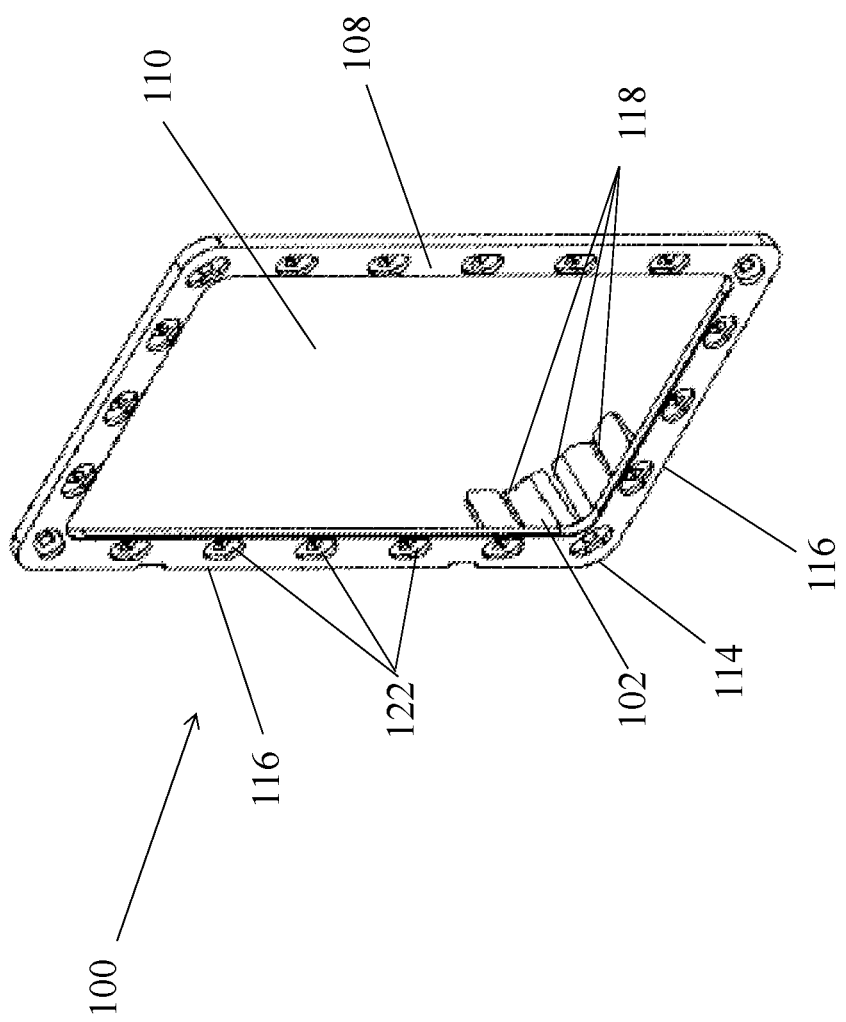
FIG. 2 is a rear perspective view of the electrical outlet cover gasket shown in FIG. 1.

The present disclosure concerns a gasket 100 comprising an integrated bug cover 102. The gasket 100 may be installed in an electrical outlet cover 104 and is configured to place the bug cover 102 in a position to limit the entrance of bugs and other contaminants into the electrical outlet cover 104. As shown in FIGS. 1-2, in addition to the bug cover 102, the gasket 100 comprises a front face 106, a rear face 108 opposite the front face 106, and a central aperture 110 extending through the gasket 100. The central aperture 110 may form the gasket 100 into a continuous ring around the central aperture 110. The front face 106 and the rear face 108 may be rectangular. The gasket 100 may be formed of only one material. For example, the gasket 100 may be completely formed of neoprene, santoprene, or any other elastomeric material. Alternatively, the gasket 100 may be formed of any combination of these materials.

The bug cover 102 may be formed or molded as a single piece with the gasket 100 and extend forward from the front face 106. The bug cover 102 may be formed integrally with the gasket 100. The bug cover 102 is configured to cover a cord port 112 of the electrical outlet cover 104 and allow an electrical cord (not shown) to pass through when the gasket 100 is installed in the electrical outlet cover 104. In some embodiments, the bug cover 102 extends forward from a corner 114 of the front face 106, as shown in FIG. 1. In such embodiments, the bug cover 102 may also extend forward from the front face 106 on at least two sides 116 of the front face 106 as shown. Alternatively, the bug cover 102 may extend forward from the front face 106 on at least one side 116 of the front face 106.

The bug cover 102 may be configured to completely cover the cord port 112 of the electrical outlet cover 104. Alternatively, the cord port 112 may only be partially covered by the bug cover 102 when the gasket 100 is installed in the electrical outlet cover 104 and the electrical outlet cover 104 is in the closed position. The bug cover 102 may have at least one slit 118 extending through the bug cover 102. The at least one slit 118 allows an electrical cord to pass through the bug cover 102. Thus, when an electrical outlet cover 104 has the gasket 100 installed and is in the closed position, the bug cover 102 covers the cord port 112, but an electrical cord is still able to extend through the cord port 112 through the at least one slit 118.

Figure 3:
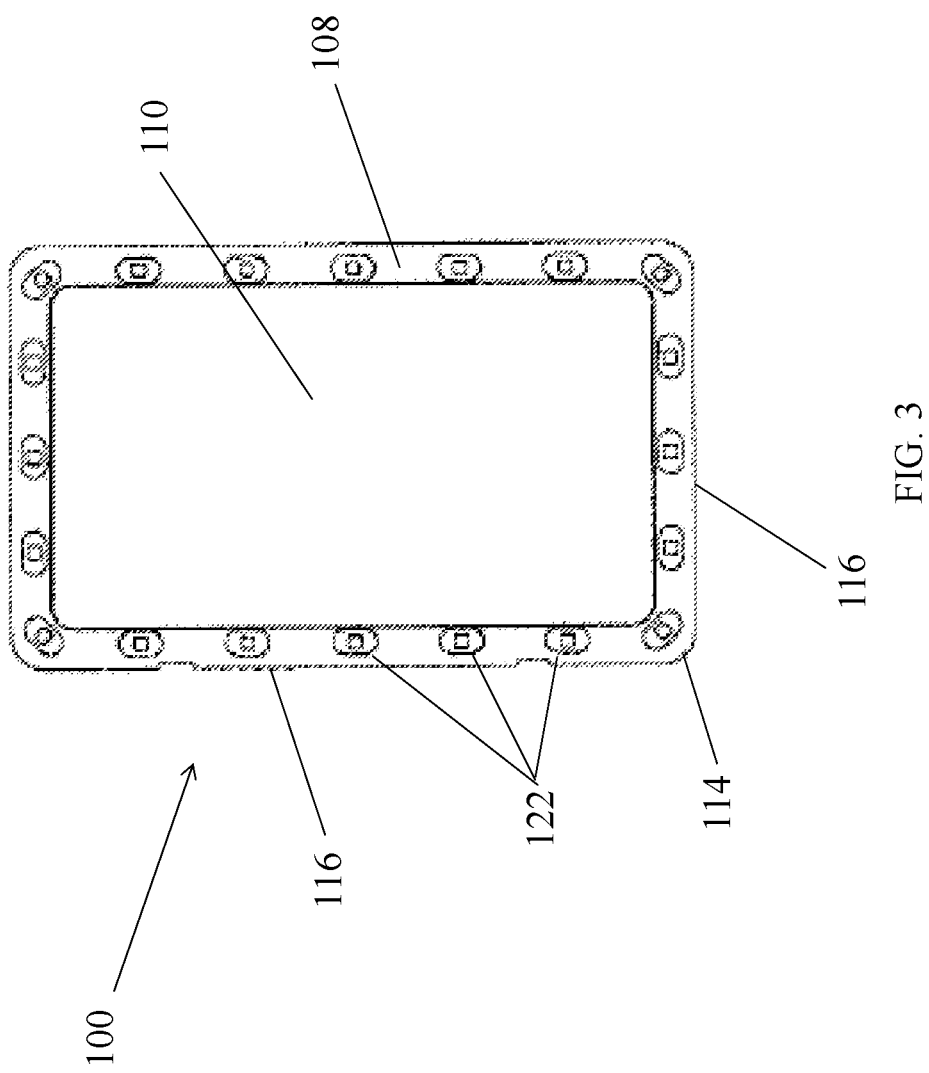
FIG. 3 is a rear view of the electrical outlet cover gasket shown in FIG. 1.
Figure 4:
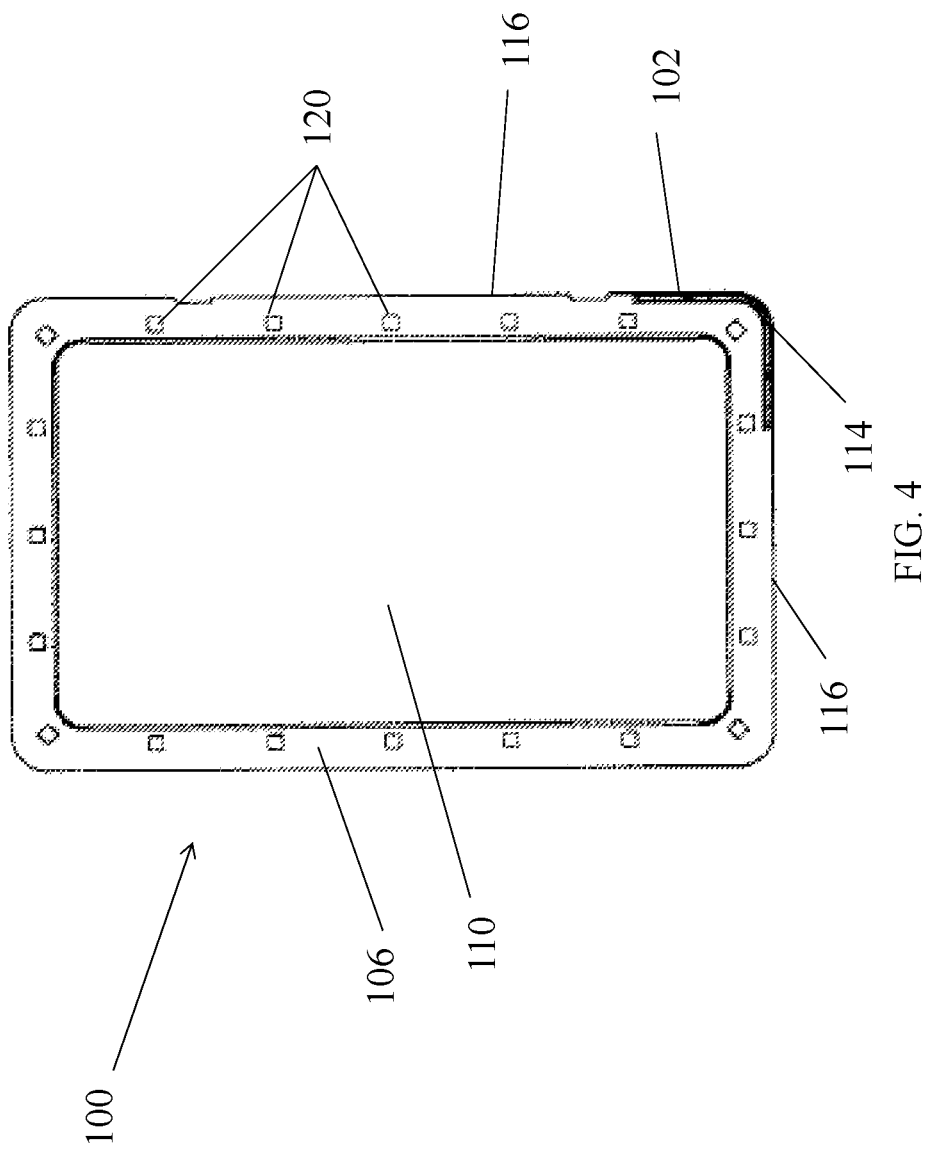
FIG. 4 is a front view of the electrical outlet cover gasket shown in FIG. 1.

Turning to FIGS. 3-4, the gasket 100 may have a plurality of prong apertures 120 arranged surrounding the central aperture 110. Each of the plurality of prong apertures 120 extends through the gasket 100 and is configured to receive a prong of a plurality of prongs of the electrical outlet cover 104. The plurality of prongs helps to hold the gasket 100 in place once installed in the electrical outlet cover 104. Additionally, the gasket 100 may comprise a plurality of troughs 122 in the rear face 108. Each of the plurality of troughs 122 is aligned with a prong aperture 120 of the plurality of prong apertures 120 (see FIG. 3) and is configured to couple with an end of the prong when the prong extends through the prong aperture. For example, the end of the prong may have a larger cross-sectional area than the majority of the prong. When the prong is inserted into each of the prong apertures 120, the end of the prong sits within the corresponding trough 122 and holds the prong within the prong aperture 120.

Figure 5:
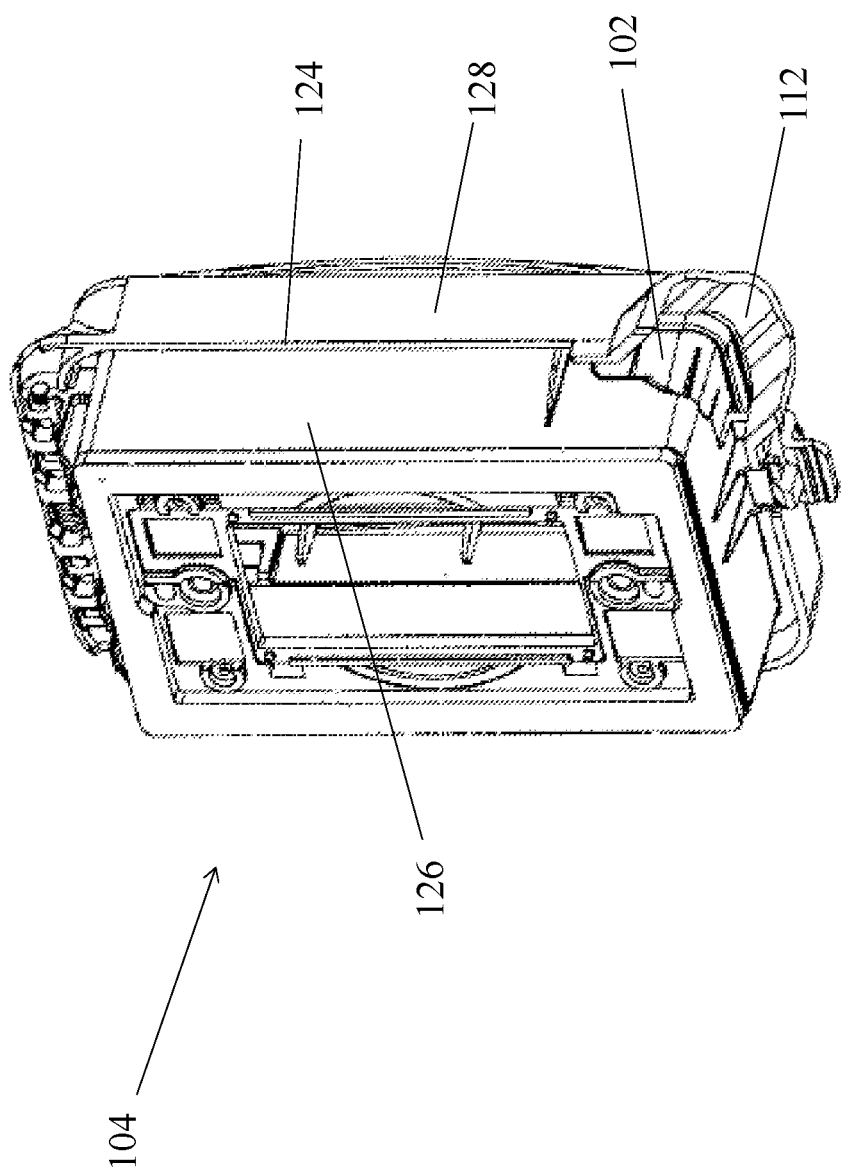
FIG. 5 is a perspective view of an electrical outlet cover in a closed position with the electrical outlet cover gasket shown in FIG. 1 installed.
Figure 6:
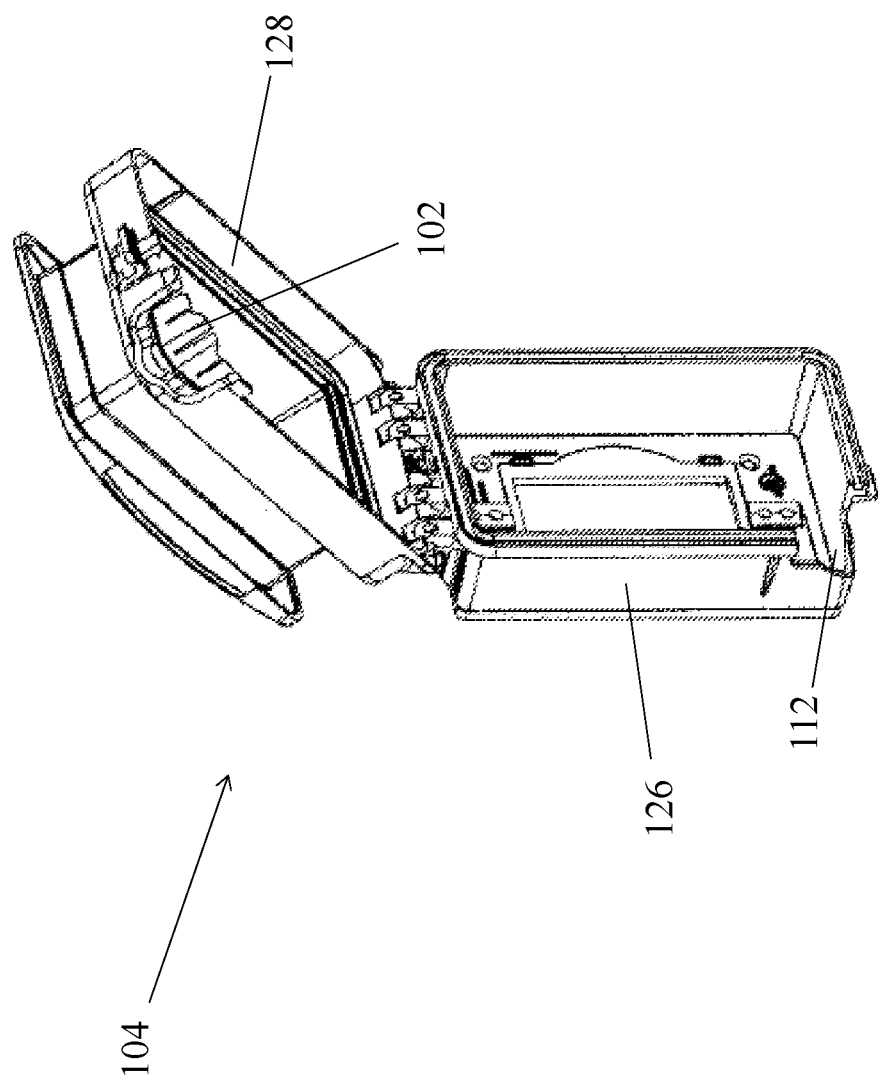
FIG. 6 is a perspective view of the electrical outlet cover shown in FIG. 5 in an open position with the electrical outlet cover gasket installed.

Turning to FIGS. 5-6, the gasket 100 is configured to extend along an interface 124 between a base 126 and a lid 128 of the electrical outlet cover 104 and limit the entrance of water into the electrical outlet cover 104 through the interface 124 between the base 126 and the lid 128 when the gasket 100 is installed in the electrical outlet cover 104 and the lid 128 is in the closed position. As shown in FIG. 5, when the lid 128 is in the closed position, the bug cover 102 covers the cord port 112.

Figure 7:
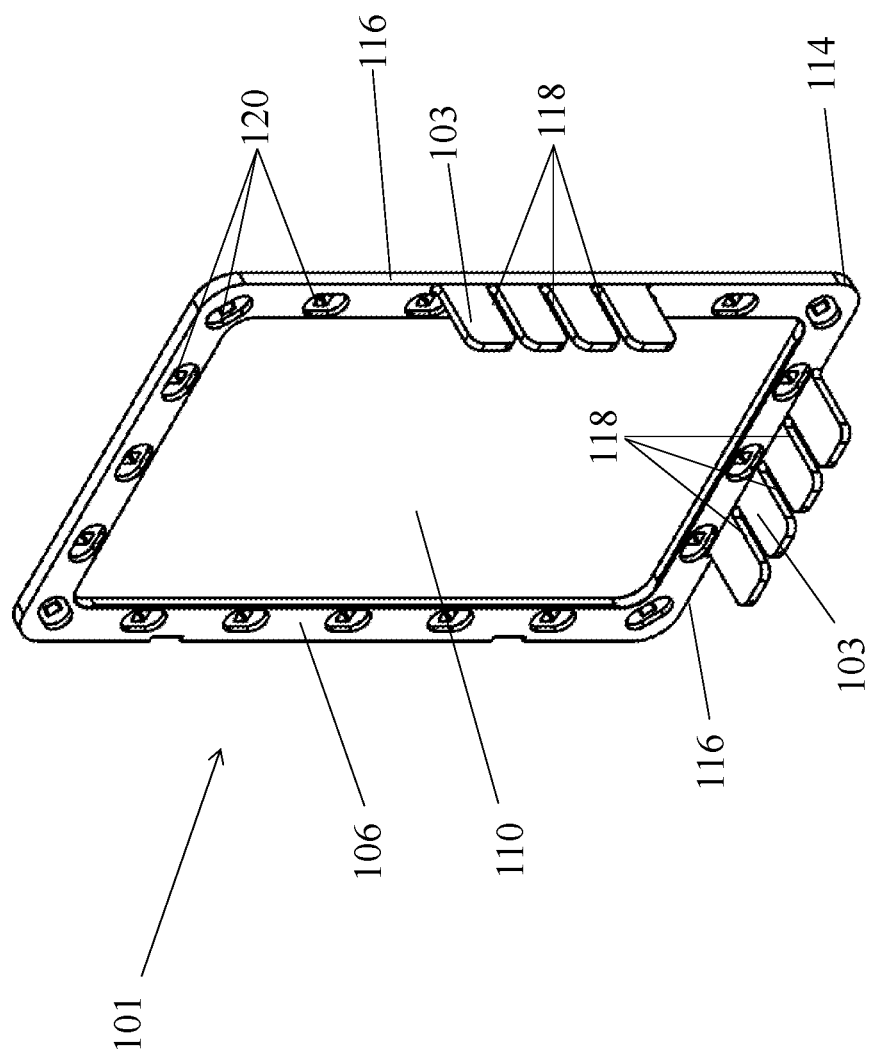
FIG. 7 is a perspective view of another embodiment of the electrical outlet cover gasket.
Figure 8:
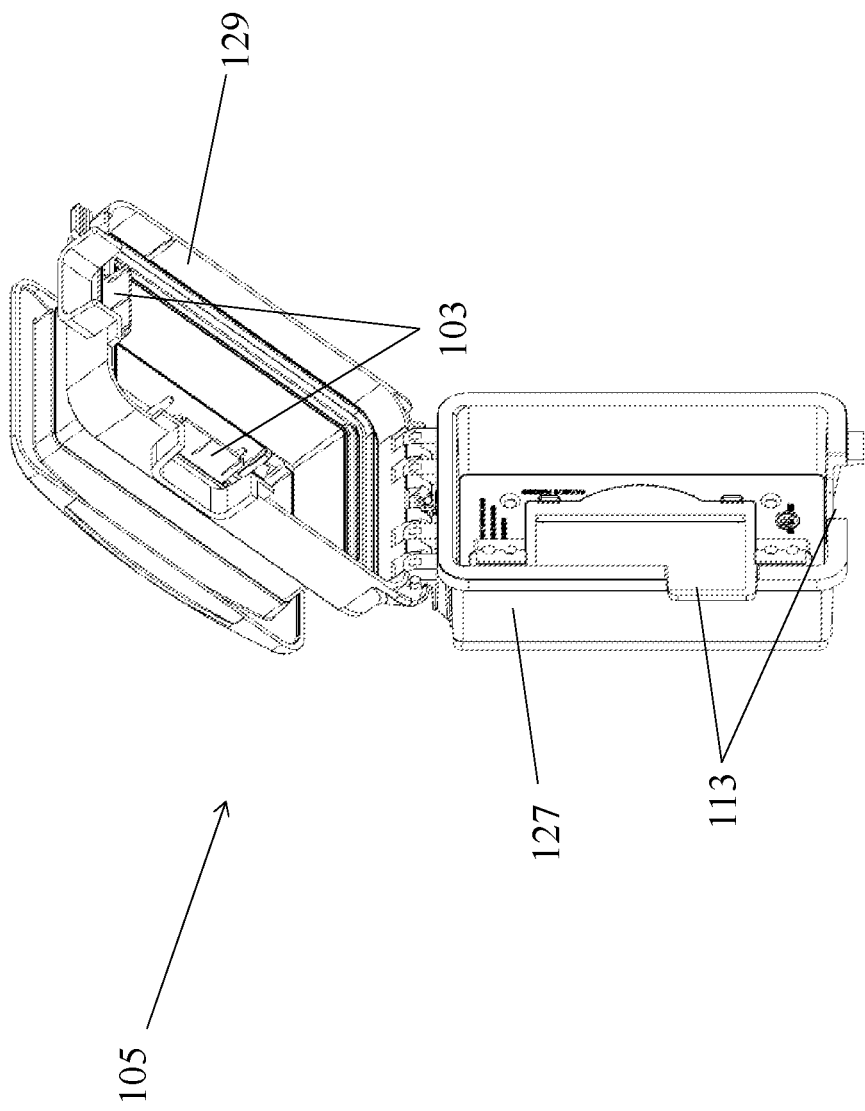
FIG. 8 is a perspective view of an electrical outlet cover in an open position with the electrical outlet cover gasket shown in FIG. 7 installed.

FIG. 7 illustrates another embodiment of the gasket 101. The gasket 101 may have the same features as the gasket 100. However, the gasket 101 has a bug cover 103 which extends forward from the front face 106 on at least one side 116 of the front face 106 or at least two sides 116 of the front face 106 without extending forward from the corner 114. As shown in FIG. 8, and similar to the gasket 100, the gasket 101 is configured to extend along an interface between a base 127 and a lid 129 of an electrical outlet cover 105 and limit the entrance of water into the electrical outlet cover 105 through the interface between the base 127 and the lid 129 when the gasket 101 is installed in the electrical outlet cover 105 and the lid 129 is in the closed position. When the lid 129 is in the closed position, the bug cover 103 covers the cord port 113.

It will be understood that implementations of a gasket-integrated bug cover are not limited to the specific assemblies, devices and components disclosed in this document, as virtually any assemblies, devices and components consistent with the intended operation of a gasket-integrated bug cover may be used. Accordingly, for example, although particular gasket-integrated bug covers, and other assemblies, devices and components are disclosed, such may include any shape, size, style, type, model, version, class, measurement, concentration, material, weight, quantity, and/or the like consistent with the intended operation of gasket-integrated bug covers. Implementations are not limited to uses of any specific assemblies, devices and components; provided that the assemblies, devices and components selected are consistent with the intended operation of a gasket-integrated bug cover.

Accordingly, the components defining any gasket-integrated bug cover may be formed of any of many different types of materials or combinations thereof that can readily be formed into shaped objects provided that the components selected are consistent with the intended operation of a gasket-integrated bug cover. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various gasket-integrated bug covers may be manufactured using conventional procedures as added to and improved upon through the procedures described here. Some components defining a gasket-integrated bug cover may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for gasket-integrated bug covers are not limited to the specific order of steps as disclosed in this document. Any steps or sequence of steps of the assembly of a gasket-integrated bug cover indicated herein are given as examples of possible steps or sequence of steps and not as limitations, since various assembly processes and sequences of steps may be used to assemble gasket-integrated bug covers.

The implementations of a gasket-integrated bug cover described are by way of example or explanation and not by way of limitation. Rather, any description relating to the foregoing is for the exemplary purposes of this disclosure, and implementations may also be used with similar results for a variety of other applications employing a gasket-integrated bug cover.

What is claimed is:

1. An electrical outlet cover gasket, comprising:
   a continuous ring configured to be installed in an electrical outlet cover, the electrical outlet cover configured to couple to and cover an electrical receptacle, wherein the ring is configured to limit the entrance of water into the electrical outlet cover when the electrical outlet cover is in a closed position and allow an electrical plug to mate with the electrical receptacle; and
   a bug cover extending forward from the ring and having at least one slit therethrough, the bug cover configured to cover a cord port of the electrical outlet cover and the at least one slit configured to allow an electrical cord to pass through the cord port when the gasket is installed in the electrical outlet cover.

2. The electrical outlet cover gasket of claim 1, wherein the ring is rectangular.

3. The electrical outlet cover gasket of claim 1, wherein the bug cover extends forward from a corner of the ring.

4. The electrical outlet cover gasket of claim 1, wherein the bug cover extends forward from the ring on at least two sides of the ring.

5. The electrical outlet cover gasket of claim 1, wherein the gasket is formed of only one material.

6. The electrical outlet cover gasket of claim 1, wherein the gasket is configured to extend along an interface between a base and a lid of the electrical outlet cover and limit the entrance of water into the electrical outlet cover through the interface when the gasket is installed in the electrical outlet cover and the electrical outlet cover is in the closed position.

7. The electrical outlet cover gasket of claim 1, wherein the bug cover is configured to completely cover the cord port of the electrical outlet cover.

8. An electrical outlet cover gasket, comprising:
   a ring configured to be installed in an electrical outlet cover, the electrical outlet cover configured to couple to and cover an electrical receptacle, wherein the ring is configured to limit the entrance of water into the electrical outlet cover when the electrical outlet cover is in a closed position and allow an electrical plug to mate with the electrical receptacle; and
   a bug cover extending forward from a front surface, the bug cover configured to cover a cord port of the electrical outlet cover and allow an electrical cord to pass through the cord port when the gasket is installed in the electrical outlet cover, wherein the bug cover is formed as a single piece with the ring.

9. The electrical outlet cover gasket of claim 8, wherein the ring is rectangular.

10. The electrical outlet cover gasket of claim 8, wherein the bug cover extends forward from a corner of the ring.

11. The electrical outlet cover gasket of claim 8, wherein the bug cover extends forward from the ring on at least two sides of the ring.

12. The electrical outlet cover gasket of claim 8, wherein the gasket is configured to extend along an interface between a base and a lid of the electrical outlet cover and limit the entrance of water into the electrical outlet cover through the interface when the gasket is installed in the electrical outlet cover and the electrical outlet cover is in the closed position.

13. The electrical outlet cover gasket of claim 8, wherein the bug cover is configured to completely cover the cord port of the electrical outlet cover.

14. An electrical outlet cover gasket, comprising:
   a ring configured to be installed in an electrical outlet cover, the electrical outlet cover configured to couple to and cover an electrical receptacle, wherein the ring is configured to limit the entrance of water into the electrical outlet cover when the electrical outlet cover is in a closed position and allow an electrical plug to mate with the electrical receptacle; and
   a bug cover extending forward from a front surface, the bug cover configured to cover a cord port of the electrical outlet cover and allow an electrical cord to pass through the cord port when the gasket is installed in the electrical outlet cover.

15. The electrical outlet cover gasket of claim 14, wherein the ring is rectangular.

16. The electrical outlet cover gasket of claim 14, wherein the bug cover extends forward from a corner of the ring.

17. The electrical outlet cover gasket of claim 14, wherein the bug cover extends forward from the ring on at least two sides of the ring.

18. The electrical outlet cover gasket of claim 14, wherein the gasket is formed of only one material.

19. The electrical outlet cover gasket of claim 14, wherein the gasket is configured to extend along an interface between a base and a lid of the electrical outlet cover and limit the entrance of water into the electrical outlet cover through the interface when the gasket is installed in the electrical outlet cover and the electrical outlet cover is in the closed position.

20. The electrical outlet cover gasket of claim 14, wherein the bug cover is configured to completely cover the cord port of the electrical outlet cover.

* * * * *